United States Patent
Su et al.

(10) Patent No.: US 10,683,992 B2
(45) Date of Patent: Jun. 16, 2020

(54) DIRECT-TYPE BACKLIGHT MODULE AND LED ARRAY

(71) Applicant: HUIZHOU CHINA STAR OPTOELECTRONICS TECHNOLOGY CO., LTD., Huizhou (CN)

(72) Inventors: Zanjia Su, Huizhou (CN); Yongyuan Qiu, Huizhou (CN); Xiaoyu He, Huizhou (CN)

( * ) Notice: Subject to any disclaimer, the term of this patent is extended or adjusted under 35 U.S.C. 154(b) by 0 days.

(21) Appl. No.: 16/315,639

(22) PCT Filed: Sep. 12, 2018

(86) PCT No.: PCT/CN2018/105127
§ 371 (c)(1),
(2) Date: Jan. 6, 2019

(87) PCT Pub. No.: WO2020/042220
PCT Pub. Date: Mar. 5, 2020

(65) Prior Publication Data
US 2020/0072445 A1    Mar. 5, 2020

(30) Foreign Application Priority Data
Aug. 31, 2018  (CN) .......................... 2018 1 1012861

(51) Int. Cl.
*F21V 17/06*    (2006.01)
*F21V 3/00*    (2015.01)
(Continued)

(52) U.S. Cl.
CPC ................ *F21V 17/06* (2013.01); *F21V 3/00* (2013.01); *F21V 5/04* (2013.01); *F21Y 2115/10* (2016.08)

(58) Field of Classification Search
CPC ............... F21V 17/06; F21V 3/00; F21V 5/04
See application file for complete search history.

(56) References Cited

U.S. PATENT DOCUMENTS

| 2008/0231772 | A1  | 9/2008  | Hung |
| 2012/0087122 | A1* | 4/2012  | Takeuchi .......... G02F 1/133603 362/235 |
| 2015/0338059 | A1* | 11/2015 | Allen .................... F21V 7/0033 362/300 |

FOREIGN PATENT DOCUMENTS

| CN | 1959492 A   | 5/2007 |
| CN | 202419335 U | 9/2012 |

(Continued)

*Primary Examiner* — Thomas M Sember

(57) ABSTRACT

A direct-type backlight module and a LED array are provided. The backlight module includes a supporting plate; a LED array, disposed on the supporting plate, the LED array including a LED light source; an optical lens encapsulating the LED light source, the optical lens including a light entrance surface and a light exit surface for light rays emitted from the LED light source; a light adjusting structure, disposed apart from the supporting plate, a chamber defined between the light adjusting structure and the supporting plate; and a supporting structure, disposed on the light exit surface of the optical lens, extending within the chamber toward the light adjusting structure along a direction away from the supporting plate, the supporting structure configured to support the light adjusting structure. Generation of dark shadows is suppressed and structural strength of the supporting structure is enhanced.

16 Claims, 5 Drawing Sheets

(51) Int. Cl.
*F21V 5/04* (2006.01)
*F21Y 115/10* (2016.01)

(56) References Cited

FOREIGN PATENT DOCUMENTS

| CN | 103727493 A | 4/2014 |
|---|---|---|
| CN | 204494220 U | 7/2015 |

* cited by examiner

DIRECT-TYPE BACKLIGHT MODULE AND LED ARRAY

FIELD OF THE DISCLOSURE

The present application relates to backlight technologies, and more particularly, to a direct-type backlight module and a light-emitting diode (LED) array.

DESCRIPTION OF RELATED ARTS

Currently, a direct-type backlight module is generally implemented by two types of ways. One way is to attach LED light sources by way of surface mounting technologies. The other way is to attach the LED light sources by the surface mounting and cooperate with a secondary lens. The first needs a large number of LEDs. The second can reduce the number of LEDs.

No matter what way is utilized, it always needs a supporting structure for a diffuser of the backlight module to prevent it from being deformed due to thermal expansion or contraction, or vibration in transportation, avoiding lowering the quality or damaging the LED light sources when a chamber is of a low height.

TECHNICAL PROBLEMS

The supporting structure utilized in the existing arts has the following problems:

(1) When the light rays emitted by the LED light sources at large angles encounter the supporting structure, dark shadows are generated because propagation of the light rays is obstructed; and (2) the supporting structure may be deformed when the temperature within a chamber of the backlight module increases during the LED light sources work or when the environmental temperature is too high in transportation, or deformation of the supporting structure may be generated in transporting the backlight module, and the deformation is not recoverable.

TECHNICAL SOLUTIONS

The objective of the present application is to provide a direct-type backlight module and a LED array for suppressing generation of dark shadows.

To achieve above objective, an aspect of the present application provides a direct-type backlight module, including: a supporting plate; a LED array, disposed on the supporting plate, the LED array including a LED light source; an optical lens encapsulating the LED light source, the optical lens including a light entrance surface and a light exit surface for light rays emitted from the LED light source; a diffuser, disposed apart from the supporting plate, a chamber defined between the diffuser and the supporting plate, the LED array and the optical lens accommodated in the chamber; an optical film, disposed on the diffuser; and a supporting structure, disposed on the light exit surface of the optical lens, extending within the chamber toward the diffuser along a direction away from the supporting plate, the supporting structure configured to support the diffuser.

In an embodiment of the present application, the supporting structure includes a cone-shaped body.

In an embodiment of the present application, the supporting structure is symmetrically deployed with respect to a symmetrical plane of the optical lens.

In an embodiment of the present application, the optical lens is selected from a group consisting of a refractive type lens and a refractive-and-reflected type lens.

In an embodiment of the present application, a height of the supporting structure is less than or equal to 3 millimeters and a height of the chamber is less than a total of a height of the optical lens and the height of the supporting structure.

In an embodiment of the present application, a radius of curvature of a top portion of the supporting structure is less than or equal to 1 millimeter and a volume of the supporting structure is less than or equal to 7 cubic millimeters.

Another aspect of the present application provides a direct-type backlight module, including: a supporting plate; a LED array, disposed on the supporting plate, the LED array including a LED light source; an optical lens encapsulating the LED light source, the optical lens including a light entrance surface and a light exit surface for light rays emitted from the LED light source; a light adjusting structure, disposed apart from the supporting plate, a chamber defined between the light adjusting structure and the supporting plate; and a supporting structure, disposed on the light exit surface of the optical lens, extending within the chamber toward the light adjusting structure along a direction away from the supporting plate, the supporting structure configured to support the light adjusting structure.

In an embodiment of the present application, the supporting structure includes a cone-shaped body.

In an embodiment of the present application, the supporting structure is symmetrically deployed with respect to a symmetrical plane of the optical lens.

In an embodiment of the present application, the light adjusting structure includes: a diffuser; and an optical film, disposed on the diffuser, wherein the chamber is defined between the diffuser of the light adjusting structure and the supporting plate supporting the LED array.

In an embodiment of the present application, the optical lens is selected from a group consisting of a refractive type lens and a refractive-and-reflected type lens.

In an embodiment of the present application, a height of the supporting structure is less than or equal to 3 millimeters and a height of the chamber is less than a total of a height of the optical lens and the height of the supporting structure.

In an embodiment of the present application, a radius of curvature of a top portion of the supporting structure is less than or equal to 1 millimeter and a volume of the supporting structure is less than or equal to 7 cubic millimeters.

Still another aspect of the present application provides a LED array, including: a LED light source; an optical lens encapsulating the LED light source, the optical lens including a light entrance surface and a light exit surface for light rays emitted from the LED light source; and a supporting structure, disposed on the light exit surface of the optical lens, extending along a direction away from the optical lens.

In an embodiment of the present application, the supporting structure includes a cone-shaped body.

In an embodiment of the present application, the supporting structure is symmetrically deployed with respect to a symmetrical plane of the optical lens.

BENEFICIAL EFFECTS

In the direct-type backlight module of the embodiments of the present application, the supporting structure disposed on the light exit surface of the optical lens acts to support the chamber. Compared to the existing arts, the backlight module of the embodiments of the present application has the following advantages: (1) the supporting structure is disposed on the light exit surface of the optical lens, and therefore it does not need an extra process to dispose the supporting structure, it is cost effective with improved assembling efficiency; and (2) the supporting structure is disposed on the light exit surface of the optical lens, and therefore the supporting structure is of a low height and has better structural strength, solving the problem of a supporting structure easily to be bent and deformed.

DESCRIPTION OF DRAWINGS

To make above content of the present invention more easily understood, it will be described in details by using preferred embodiments in conjunction with the appending drawings.

DESCRIPTION OF EMBODIMENTS OF THE DISCLOSURE

To make the objectives, technical schemes, and effects of the present application more clear and specific, the present application is described in further detail below with reference to the embodiments in accompanying with the appending drawings. It should be understood that the specific embodiments described herein are merely for explaining the present application, the term "embodiment" used in the context means an example, instance, or illustration, and the present application is not limited thereto.

Figure 1:
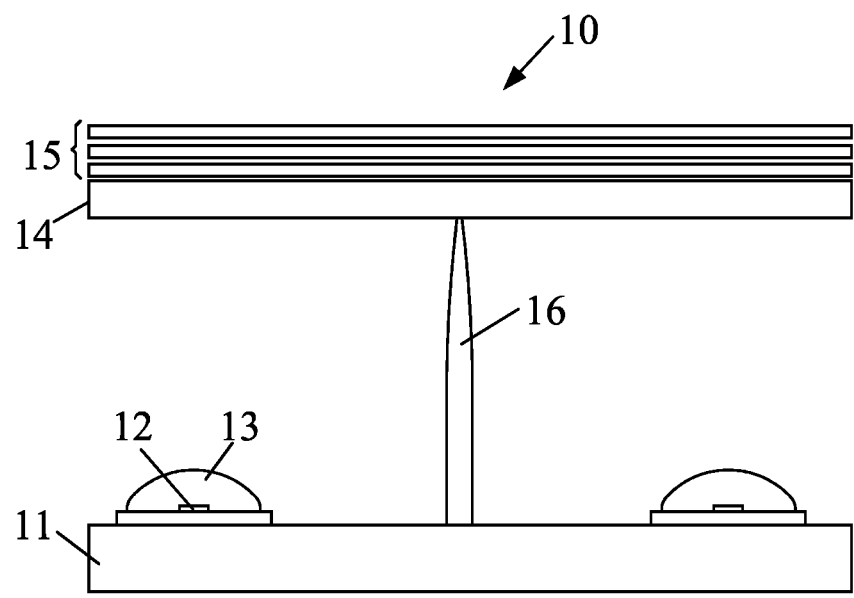
FIG. 1 is a schematic diagram illustrating an existing light-emitting diode (LED) backlight module.

FIG. 1 is a schematic diagram illustrating an existing light-emitting diode (LED) backlight module 10. The existing LED backlight module 10 includes a supporting plate 11, a LED light source 12 disposed on the supporting plate 11, a secondary lens 13 encapsulating the LED light source 12, a diffuser 14 disposed apart from the supporting plate 11, an optical film 15 disposed on the diffuser 14, and a supporting structure 16 disposed on the supporting structure 11 and configured to support the diffuser 14.

Generally, a height (indicated by Hs) of the supporting structure 16 is identical to a height (indicated by Hc) of a chamber formed between the supporting plate 11 and the diffuser 14, or Hs is smaller than Hc by 1 to 2 millimeters. Regarding the supporting structure 16, the existing backlight module 10 has a serious problem. This problem is more apparent in a framework (i.e., FIG. 1) in which the LED light source 12 that is attached by surface mounting technologies cooperates with the secondary lens 13, as explained below.

Figure 2:
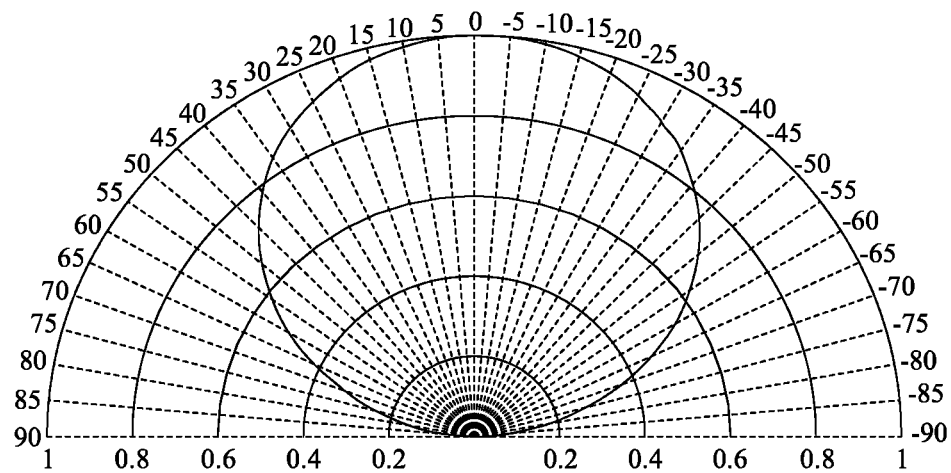
FIG. 2 depicts a Lambert-type lighting pattern.
Figure 3:
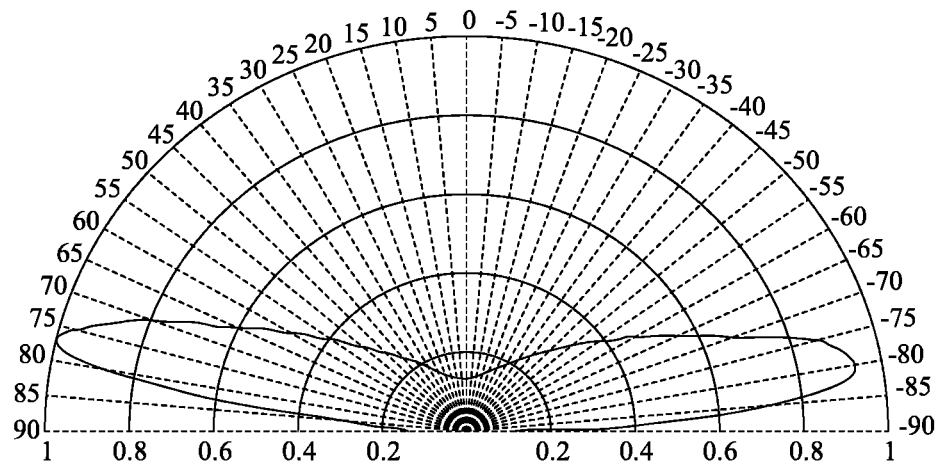
FIG. 3 depicts a lighting pattern generated via a secondary lens.
Figure 4:
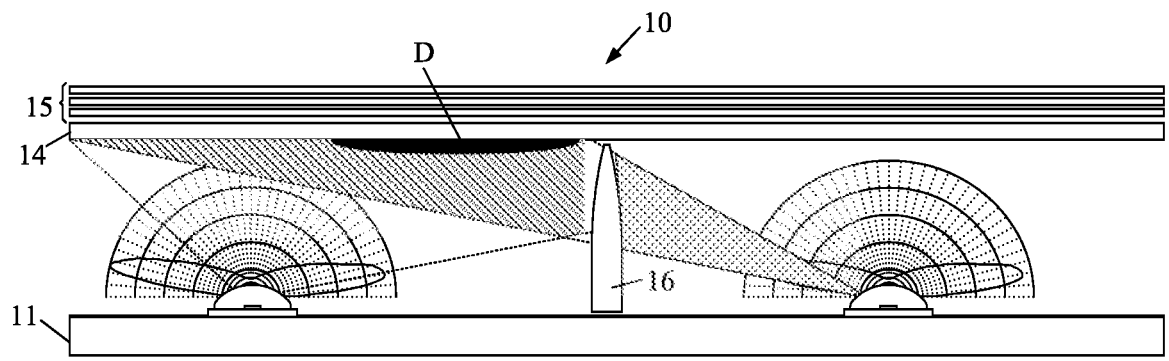
FIG. 4 illustrates light paths for generation of a dark shadow in an existing art.

The lighting pattern of the LED light source 12 configured for the backlight module 10 generally belongs to a Lambert type, as shown in FIG. 2. The secondary lens 16 will "open" the lighting pattern of the LED light source 12 such that optical energy increases at large angles, as shown in FIG. 3. When the light rays at large angles propagate to the supporting structure 16, it is easy for the light rays to be obstructed by a top portion of the supporting structure 16, thereby leaving a dark shadow on the diffuser 14 and the optical film 15. FIG. 4 illustrates light paths for the generation of the dark shadow. When the light rays at large angles encounter the supporting structure 16, propagation of the light rays is obstructed and thus the dark shadow is generated. The dark shadow is indicated by D in FIG. 4.

Figure 5A:
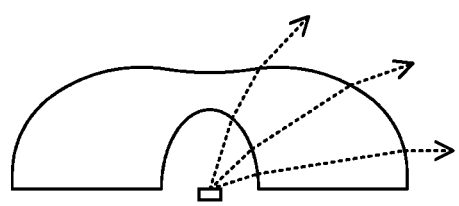
FIG. 5A is a schematic diagram illustrating a framework including a LED light source and a cooperated refractive type lens.
Figure 5B:
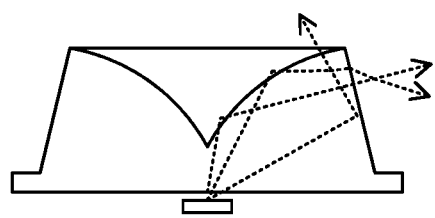
FIG. 5B is a schematic diagram illustrating a framework including a LED light source and a cooperated refractive-and-reflected type lens.
Figure 5C:
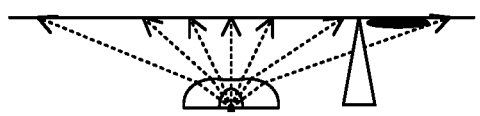
FIG. 5C illustrates light paths corresponding to FIG. 5A.
Figure 5D:
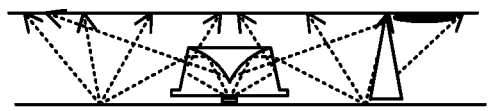
FIG. 5D illustrates light paths corresponding to FIG. 5B.

FIG. 5A is a schematic diagram illustrating a framework including the LED light source 12 and a cooperated refractive type lens. FIG. 5B is a schematic diagram illustrating a framework including the LED light source 12 and a cooperated refractive-and-reflected type lens. In afore-described example, the secondary lens 13 is a refractive type lens (as shown in FIG. 5A). When the secondary lens 13 is a refractive-and-reflected type lens, the problem still exists. Propagation of the light rays is still obstructed and the dark shadow is generated in a similar manner, as illustrated in FIG. 5C and FIG. 5D. FIG. 5C is a diagram showing light paths of the light rays propagating to the diffuser 14 in the example employing the refractive type lens. FIG. 5D is a diagram showing light paths of the light rays propagating to the diffuser 14 in the example employing the refractive-and-reflected type lens.

The supporting structure 16 acts to support something. The supporting structure 16 has to maintain its original shape under a certain degree of environmental temperature and a certain degree of stress exerted by an external force. However, the technical problem in the existing backlight module 10 is that the supporting structure 16 may be deformed when the temperature within the chamber of the backlight module 10 increases during the LED light source 12 works or when the environmental temperature is too high in transportation, or a certain degree of deformation of the supporting structure 16 may be generated in transporting the backlight module 10. Meanwhile, the supporting structure 16 loses its ability to maintain the height of the chamber and the deformation is not recoverable.

Figure 6:
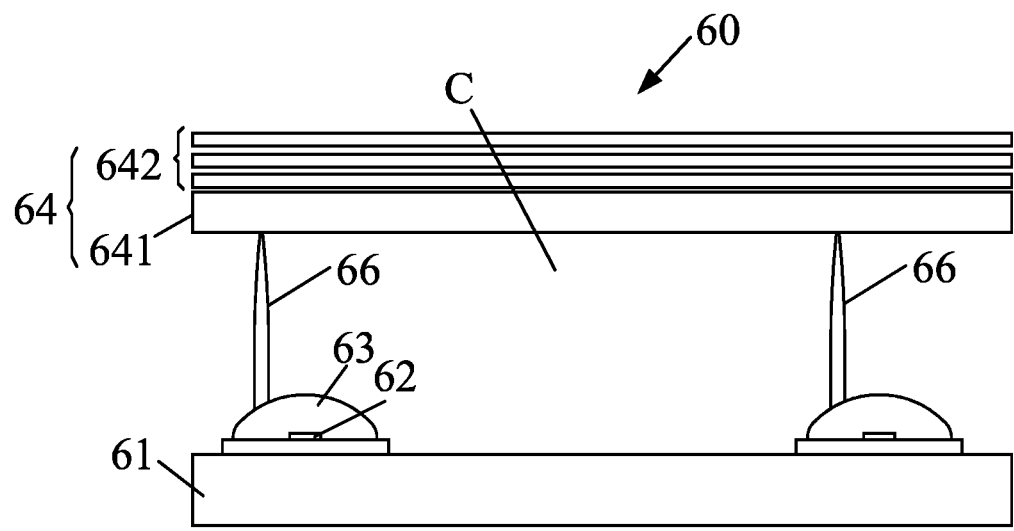
FIG. 6 is a schematic diagram illustrating a direct-type backlight module according to an embodiment of the present application.

FIG. 6 is a schematic diagram illustrating a direct-type backlight module 60 according to an embodiment of the present application. As shown in FIG. 6, the backlight module 60 includes a supporting plate 61, a LED array, a light adjusting structure 64, and a supporting structure 66. The LED array is disposed on the supporting plate 61. The LED array includes a plurality of LED light source 62 arranged in a matrix. The LED light sources 62 may be deployed on a circuit board and the circuit board is then deployed on the supporting plate 61. The lighting pattern of one of the LED light sources 62 may be a Lambert type, as shown in FIG. 2. An optical lens 63 is disposed corresponding to the LED light source 62. The optical lens 63 encapsulates or covers the LED light source 62 and is provided for changing the lighting pattern of the LED light source 62. The optical lens 63 can be a refractive type lens (such as the lens shown in FIG. 5A) or a refractive-and-reflected type lens (such as the lens shown in FIG. 5B). The optical lens 63 has a light entrance surface and a light exit surface. The light rays emitted by the LED light source 62 enter the optical lens 63 via the light entrance surface and leave the optical lens 63 via the light exit surface.

The light adjusting structure 64 is disposed apart from the supporting plate 61. A chamber C is defined between the light adjusting structure 64 and the supporting plate 61. The light adjusting structure 64 is configured to adjust the light rays in a further step such that the backlight module 60 emits even light rays. In an embodiment, the light adjusting structure 64 includes a diffuser 641 and an optical film 642. The optical film 642 is disposed on the diffuser 641. The optical film 642 may consist of one or more than one layers of optical films such as a releasing film, a reflecting film, a diffusing film, a prism film, and a diffusing and light enhancing film. In this embodiment, the optical film 642 is disposed on a top surface of the diffuser 641. The chamber C is defined between the supporting plate 641 of the light adjusting structure 64 and the supporting plate 11 supporting the LED array. In another embodiment, another optical film may also be disposed on a bottom surface of the diffuser 641. The chamber C is defined between said another optical film and the supporting plate 11.

The supporting structure 66 is disposed on the light exit surface of the optical lens 63. For example, each optical lens 63 has a corresponding supporting structure 66. For example, the supporting structure 66 includes a cone-shaped body. The supporting structure 66 extends within the chamber C toward the light adjusting structure 64 along a direction away from the supporting plate 61. The supporting structure 66 is configured to support the light adjusting structure 64. For example, the supporting plate 61 and the light adjusting structure 64 have two parallel planes opposite to each other. The supporting structure 66 extends toward the light adjusting structure 64 along a direction perpendicular to the parallel planes. One end of the supporting structure 66 is formed on the light exit surface of the optical lens 63 and the other end of the supporting structure 66 right abuts on the light adjusting structure 66 or is apart from the light adjusting structure 66 for a small distance, for example, 1 to 2 millimeters.

In an embodiment, the supporting structure 66 extends within the chamber defined between the supporting plate 61 and the diffuser 641 of the light adjusting structure 64 and basically abuts on the diffuser 641. In another embodiment, the supporting structure 66 extends within the chamber defined between the supporting plate 61 and an optical film disposed on a bottom surface of the diffuser 641 and basically abuts on said optical film.

In an embodiment, the material of the supporting structure 66 is identical to the material of the optical lens 63. In an embodiment, the supporting structure 66 and the optical lens 63 are integratedly formed. In this way, the structural strength of the supporting structure 66 increases. Of course, the supporting structure 66 may also be fastened on the light exit surface of the optical lens 63 by adhering or by a mechanical way.

Figure 7:
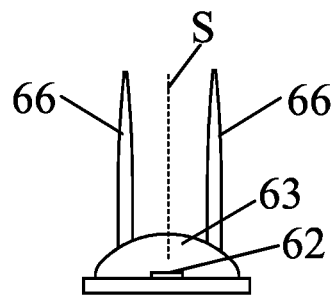
FIG. 7 illustrates a configuration of a supporting structure according to an embodiment of the present application.

As shown in FIG. 7, two or more than two supporting structures 66 can be disposed on the light exit surface of each optical lens 63. The supporting structures 66 may be symmetrically deployed with respect to a symmetrical plane of the optical lens 63. In this way, the strength of the supporting structure 66 can be improved.

Figure 8A:
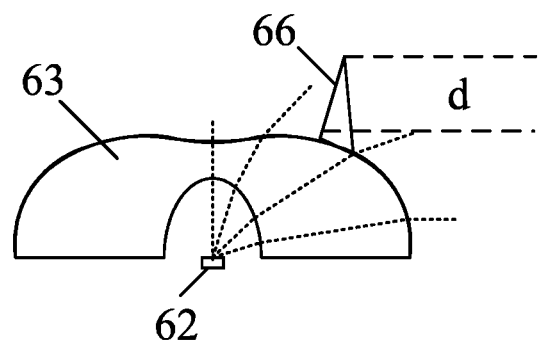
FIG. 8A is a schematic diagram illustrating a framework with a supporting structure applied to a refractive type lens according to an embodiment of the present application.
Figure 8B:
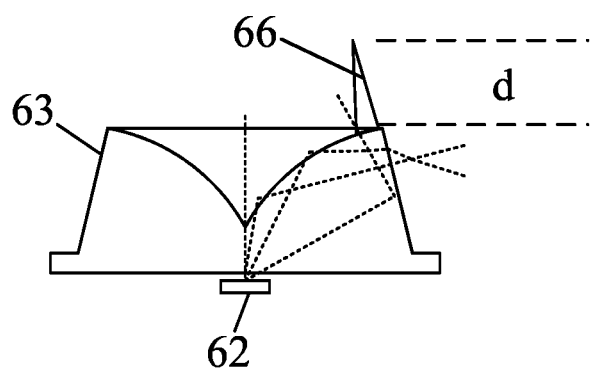
FIG. 8B is a schematic diagram illustrating a framework with a supporting structure applied to a refractive-and-reflected type lens according to an embodiment of the present application.

FIG. 8A is a schematic diagram illustrating a framework with the supporting structure 66 applied to a refractive type lens according to an embodiment of the present application. FIG. 8B is a schematic diagram illustrating a framework with the supporting structure 66 applied to a refractive-and-reflected type lens according to an embodiment of the present application. As shown in FIG. 8A, the refractive type lens may be made using a single material. The light exit surface of the refractive type lens is a curved surface. The supporting structure 66 is disposed on the curved surface. As shown in FIG. 8B, the refractive-and-reflected type lens may include a top and a bottom material layers made using two different materials. An interface is formed between the two material layers. The light rays are totally reflected at this interface. The top material layer may form a top plane. The supporting structure 66 is disposed on the top plane. Compared to forming on the curved surface, the supporting structure 66 formed on the plane has better structural strength.

In order to reduce formation of the dark shadows to ensure the quality, inventors of the present application further optimize the supporting structure 66. Specifically, under the situation that the structural strength of the supporting structure 66 is ensured, optimization of dark shadow suppression can be achieved when the supporting structure 66 meets at least one of the following conditions:

(1) a height d (shown in FIG. 8A and FIG. 8B) of the supporting structure 66 is less than or equal to 3 millimeters, and a height of the chamber C is less than a total of a height of the optical lens 63 and the height of the supporting structure 66;

(2) a radius of curvature of a top portion of the supporting structure 66 is less than or equal to 1 millimeter; and (3) a volume of the supporting structure 66 is less than or equal to 7 cubic millimeters (e.g., a volume of a cone-shaped body having a bottom diameter of 3 millimeters and a height of 3 millimeters).

Figure 9:
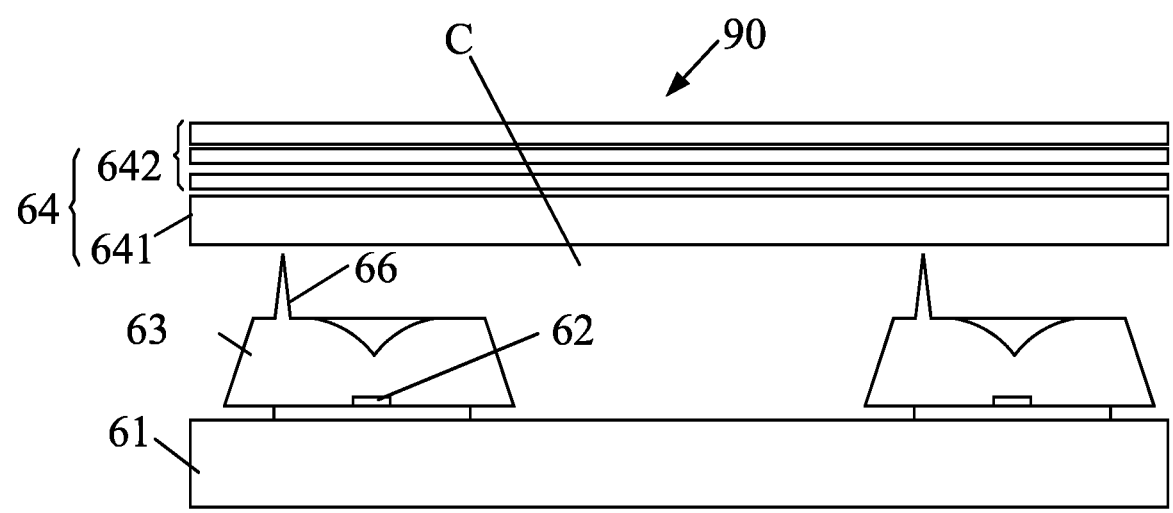
FIG. 9 is a schematic diagram illustrating a direct-type backlight module according to an embodiment of the present application.

FIG. 9 is a schematic diagram illustrating a direct-type backlight module 90 according to an embodiment of the present application. In the embodiment of FIG. 9, the optical lens 63 is a refractive-and-reflected type lens having a top plane. The supporting structure 66 is disposed on the top plane and supports the light adjusting structure 64. The backlight module 90 shown in FIG. 9 has a better performance in dark shadow suppression and the supporting structure 66 has better structural strength.

An embodiment of the present application also provides a LED array. Details of the LED array are referred to above context and are not repeated herein.

In the direct-type backlight module of the embodiments of the present application, the supporting structure 66 disposed on the light exit surface of the optical lens 63 acts to support the chamber C. Compared to the existing arts, the backlight module of the embodiments of the present application has the following advantages: (1) the supporting structure 66 is disposed on the light exit surface of the optical lens 63, and therefore it does not need an extra process to dispose the supporting structure 66, it is cost effective with improved assembling efficiency; and (2) the supporting structure 66 is disposed on the light exit surface of the optical lens 63, and therefore the supporting structure 66 is of a low height and has better structural strength, solving the problem of a supporting structure easily to be bent and deformed.

Above all, while the preferred embodiments of the present application have been illustrated and described in detail, it is intended that the present application should not be limited to the preferred embodiment. Various modifications and alterations which maintain the realm of the present application can be made by persons skilled in this art. The protective scope of the present application is subject to the scope as defined in the claims.

The invention claimed is:

1. A direct-type backlight module, comprising:
   a supporting plate;
   a light-emitting diode (LED) array, disposed on the supporting plate, the LED array comprising a plurality of LED light sources;
   a plurality of secondary lenses, each of which encapsulates one of the LED light sources, each of the secondary lens comprising a light entrance surface and a light exit surface for light rays emitted from each of the LED light sources;
   a diffuser, disposed apart from the supporting plate, a chamber defined between the diffuser and the supporting plate, the LED array and the secondary lenses accommodated in the chamber;
   an optical film, disposed on the diffuser; and
   a plurality of supporting structures, each of which is disposed on the light exit surface of the secondary lens, extending within the chamber toward the diffuser along a direction away from the supporting plate, each of the supporting structures configured to support the diffuser.

2. The direct-type backlight module according to claim 1, wherein each of the supporting structures comprises a cone-shaped body.

3. The direct-type backlight module according to claim 1, wherein the each of the supporting structures is symmetrically deployed with respect to a symmetrical plane of the secondary lens.

4. The direct-type backlight module according to claim 1, wherein the each of the secondary lenses is selected from a group consisting of a refractive type lens and a refractive-and-reflected type lens.

5. The direct-type backlight module according to claim 1, wherein a height of each of the supporting structures is less than or equal to 3 millimeters and a height of the chamber is less than a total of a height of the secondary lens and the height of the supporting structure.

6. The direct-type backlight module according to claim 1, wherein a radius of curvature of a top portion of each of the supporting structures is less than or equal to 1 millimeter and a volume of each of the supporting structures is less than or equal to 7 cubic millimeters.

7. A direct-type backlight module, comprising:
   a supporting plate;
   a light-emitting diode (LED) array, disposed on the supporting plate, the LED array comprising a plurality of LED light sources;
   a plurality of secondary lenses, each of which encapsulates one of the LED light sources, each of the secondary lens comprising a light entrance surface and a light exit surface for light rays emitted from each of the LED light sources;
   a light adjusting structure, disposed apart from the supporting plate, a chamber defined between the light adjusting structure and the supporting plate; and
   a plurality of supporting structures, each of which is disposed on the light exit surface of the secondary lens, extending within the chamber toward the light adjusting structure along a direction away from the supporting plate, each of the supporting structures configured to support the light adjusting structure.

8. The direct-type backlight module according to claim 7, wherein each of the supporting structures comprises a cone-shaped body.

9. The direct-type backlight module according to claim 7, wherein each of the supporting structures is symmetrically deployed with respect to a symmetrical plane of the secondary lens.

10. The direct-type backlight module according to claim 7, wherein the light adjusting structure comprises:
    a diffuser; and
    an optical film, disposed on the diffuser,
    wherein the chamber is defined between the diffuser of the light adjusting structure and the supporting plate supporting the LED array.

11. The direct-type backlight module according to claim 7, wherein each of the secondary lenses is selected from a group consisting of a refractive type lens and a refractive-and-reflected type lens.

12. The direct-type backlight module according to claim 7, wherein a height of each of the supporting structures is less than or equal to 3 millimeters and a height of the chamber is less than a total of a height of the secondary lens and the height of the supporting structure.

13. The direct-type backlight module according to claim 7, wherein a radius of curvature of a top portion of each of the supporting structures is less than or equal to 1 millimeter and a volume of each of the supporting structures is less than or equal to 7 cubic millimeters.

14. A light-emitting diode (LED) array, comprising:
    a plurality of LED light sources;
    a plurality of secondary lenses, each of which encapsulates one of the LED light sources, each of the secondary lens comprising a light entrance surface and a light exit surface for light rays emitted from each of the LED light sources; and
    a plurality of supporting structures, each of which is disposed on the light exit surface of the secondary lens, extending along a direction away from the secondary lens.

15. The LED array according to claim 14, wherein each of the supporting structures comprises a cone-shaped body.

16. The LED array according to claim 14, wherein each of the supporting structures is symmetrically deployed with respect to a symmetrical plane of the secondary lens.

* * * * *